(12) United States Patent
Jeong et al.

(10) Patent No.: US 12,482,138 B2
(45) Date of Patent: Nov. 25, 2025

(54) IMMERSIVE VIDEO ENCODING METHOD AND IMMERSIVE VIDEO DECODING METHOD

(71) Applicant: ELECTRONICS AND TELECOMMUNICATIONS RESEARCH INSTITUTE, Daejeon (KR)

(72) Inventors: Jun-Young Jeong, Daejeon (KR); Gwang-Soon Lee, Daejeon (KR); Dawid Mieloch, Poznan (PL); Marek Domanski, Poznan (PL); Blazej Szydelko, Poznan (PL); Adrian Dziembowski, Poznan (PL)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 501 days.

(21) Appl. No.: 17/966,420

(22) Filed: Oct. 14, 2022

(65) Prior Publication Data

US 2023/0124419 A1  Apr. 20, 2023

(30) Foreign Application Priority Data

Oct. 14, 2021 (KR) .......... 10-2021-0136925
Sep. 29, 2022 (KR) .......... 10-2022-0124329

(51) Int. Cl.
*G06T 9/00* (2006.01)
(52) U.S. Cl.
CPC .................. *G06T 9/00* (2013.01)
(58) Field of Classification Search
CPC .......... G06T 9/00; G06T 9/001; H04N 19/597

USPC .......................................................... 345/418
See application file for complete search history.

(56) References Cited

U.S. PATENT DOCUMENTS

| 11,457,199 | B2  |  9/2022 | Lee et al. |
| 2019/0371051 | A1  | 12/2019 | Dore et al. |
| 2020/0359000 | A1  | 11/2020 | Shin et al. |
| 2021/0006830 | A1  |  1/2021 | Yun et al. |
| 2021/0235058 | A1* |  7/2021 | Yip ............... H04N 13/194 |
| 2022/0159298 | A1* |  5/2022 | Boyce ............ H04N 19/124 |
| 2022/0262041 | A1* |  8/2022 | Salahieh ........ H04N 19/20 |
| 2022/0343549 | A1* | 10/2022 | Chupeau ........ H04N 21/816 |

(Continued)

FOREIGN PATENT DOCUMENTS

KR  10-2021-0157887  12/2021

OTHER PUBLICATIONS

Szydelko et al., "Rectangular blocks in encoder-derived features for decoder-side depth estimation," International Organisation for Standardisation Organisation Nternationale De Normalisation ISO/IEC JTC1/SC29/WG04 MPEG Video Coding, Apr. 2021, 5 total pages.

*Primary Examiner* — Prabodh M Dharia
(74) *Attorney, Agent, or Firm* — KILE PARK REED & HOUTTEMAN PLLC

(57) ABSTRACT

Disclosed herein are an immersive video encoding method and an immersive video decoding method. The immersive video encoding method includes setting basic view images among input images corresponding to multiple views, generating an atlas image using the basic view images, performing encoding on the atlas image, and generating metadata about an encoded atlas image, wherein the atlas image includes a texture atlas or a depth atlas.

17 Claims, 9 Drawing Sheets

(56) References Cited

U.S. PATENT DOCUMENTS

| | | | | |
|---|---|---|---|---|
| 2022/0345714 | A1* | 10/2022 | Li | H04N 19/136 |
| 2022/0360828 | A1* | 11/2022 | Huang | H04N 21/26258 |
| 2023/0353770 | A1* | 11/2023 | Kang | H04N 19/70 |
| 2023/0362409 | A1* | 11/2023 | Chupeau | G06V 10/762 |

* cited by examiner

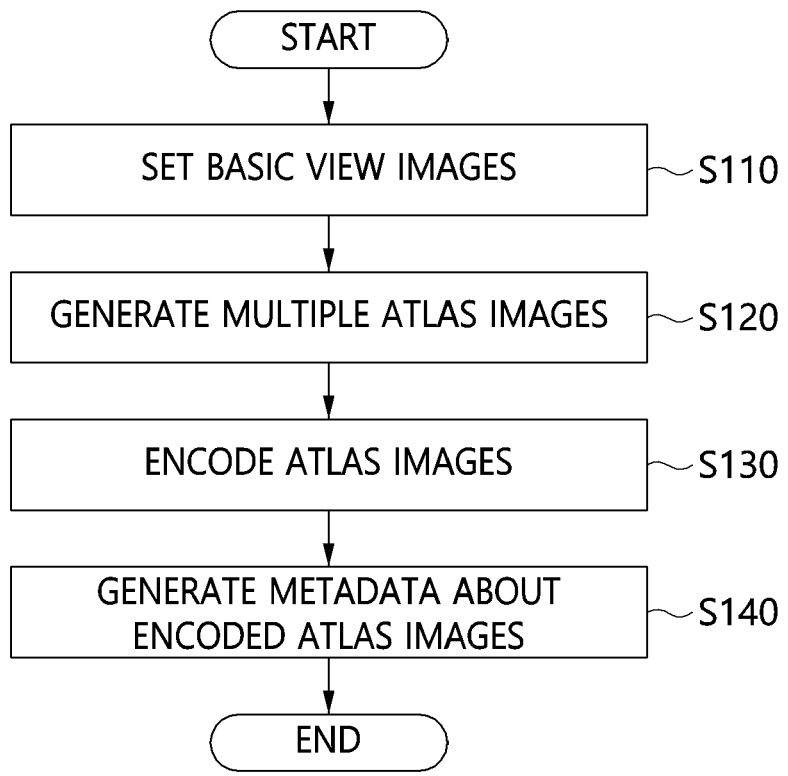
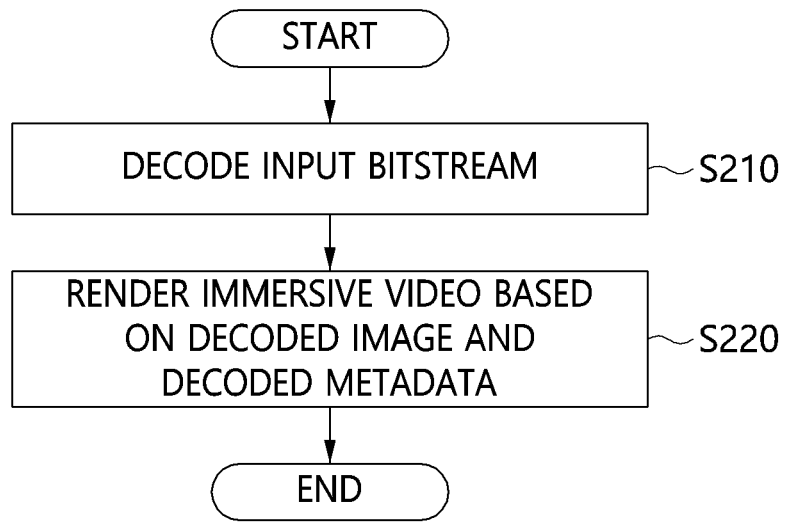

FIG. 12

| flag \ split type | □ | ⊞ | ⊟(vert) | ⊟(horiz lower) | ⊟(horiz upper small) | ⊟(vert small) | ⊟(horiz) |
|---|---|---|---|---|---|---|---|
| gas_split_flag | 0 | 1 | 1 | 1 | 1 | 1 | 1 |
| gas_quad_split_flag |  | 1 | 0 | 0 | 0 | 0 | 0 |
| gas_split_orientation_flag |  |  | 0 | 0 | 0 | 1 | 1 |
| gas_split_symmetry_flag |  |  | 1 | 0 | 1 | 0 | 0 |
| gas_split_first_block_bigger |  |  |  | 1 | 0 | 0 | 1 |

IMMERSIVE VIDEO ENCODING METHOD AND IMMERSIVE VIDEO DECODING METHOD

CROSS REFERENCE TO RELATED APPLICATIONS

This application claims the benefit of Korean Patent Application Nos. 10-2021-0136925, filed Oct. 14, 2021 and 10-2022-0124329, filed Sep. 29, 2022, which are hereby incorporated by reference in their entireties into this application.

BACKGROUND OF THE INVENTION

1. Technical Field

The present disclosure relates to a method for encoding/decoding immersive video, which support motion disparity for rotation and translation.

2. Description of the Related Art

Virtual-reality service has evolved into a technique for providing a service in which the sense of immersion and sense of realism are maximized by creating an omnidirectional video in the form of an actual image or a computer-generated (CG) image and playing the omnidirectional video on a Head-Mounted Display (HMD), a smartphone, or the like. It is known that, in order to play a natural and immersive omnidirectional video via an HMD, 6 Degrees of Freedom (DoF) must be supported. In the case of a 6DoF video, free images for six directions, such as (1) left/right (horizontal) rotation, (2) up/down (vertical) rotation, (3) left/right (horizontal) movement, and (4) up/down (vertical) movement, must be provided via an HMD screen. However, most current omnidirectional video based on actual images supports only rotational motion. Thus, research into fields related to technology for acquisition and reproduction of 6DoF omnidirectional video has been actively conducted.

SUMMARY OF THE INVENTION

Accordingly, the present invention has been made keeping in mind the above problems occurring in the prior art, and an object of the present invention is to improve the speed of a depth map estimation procedure occurring in an immersive video rendering process.

Another object of the present invention is to improve the accuracy of depth map estimation by utilizing high-quality depth map information contained in an image preprocessing step.

A further object of the present invention is to transmit accurate depth information using a recursive block split method.

In accordance with an aspect of the present invention to accomplish the above objects, there is provided an immersive video encoding method, including setting basic view images among input images corresponding to multiple views, generating an atlas image using the basic view images, performing encoding on the atlas image, and generating metadata about an encoded atlas image, wherein the atlas image includes a texture atlas or a depth atlas.

The depth atlas may be generated using basic view images corresponding to a preset condition.

Setting the basic view images may include reshuffling an order of the set basic view images.

The basic view images corresponding to the preset condition may include an image for a most distant view among the basic view images.

The metadata may include data indicating whether the encoded atlas image has depth information.

The depth atlas may be split into multiple main blocks, each of which is split into one or more sub-blocks based on whether the corresponding block is to be split.

Each of the main blocks may be split into four sub-blocks equal to each other in a height and a width, two sub-blocks equal to each other in a height and a width, or two sub-blocks different from each other in any one of a height and a width, depending on a split type.

The metadata may include information indicating whether the corresponding main block is to be split and indicating a split type.

Each sub-block may be recursively split into one or more sub-blocks based on whether the corresponding block is to be split.

The metadata may include information about a split type of the depth atlas, and the split type may include a block-based split type.

In accordance with another aspect of the present invention to accomplish the above object, there is provided an immersive video decoding method, including decoding an input bitstream, and rendering an immersive video based on a decoded image and decoded metadata, wherein the decoded image includes a texture atlas or a depth atlas.

The depth atlas may correspond to basic view images corresponding to a preset condition.

The basic view images corresponding to the preset condition may include an image for a most distant view among multiple basic view images.

The metadata may include data indicating whether the decoded image has depth information.

The depth atlas may be split into multiple main blocks, each of which is split into one or more sub-blocks based on whether the corresponding block is to be split.

Each of the main blocks may be split into four sub-blocks equal to each other in a height and a width, two sub-blocks equal to each other in a height and a width, or two sub-blocks different from each other in any one of a height and a width, depending on a split type.

The metadata may include information indicating whether the corresponding main block is to be split and indicating a split type.

Each sub-block may be recursively split into one or more sub-blocks based on whether the corresponding block is to be split.

The metadata may include information about a split type of the depth atlas, and the split type may include a block-based split type.

BRIEF DESCRIPTION OF THE DRAWINGS

The above and other objects, features and advantages of the present invention will be more clearly understood from the following detailed description taken in conjunction with the accompanying drawings, in which:

FIG. 6 is a flowchart illustrating an immersive video encoding method according to an embodiment of the present invention;

FIG. 7 is a flowchart illustrating an immersive video decoding method according to an embodiment of the present invention;

FIG. 12 is a table showing syntax values depending on split types.

DESCRIPTION OF THE PREFERRED EMBODIMENTS

Figure 1:
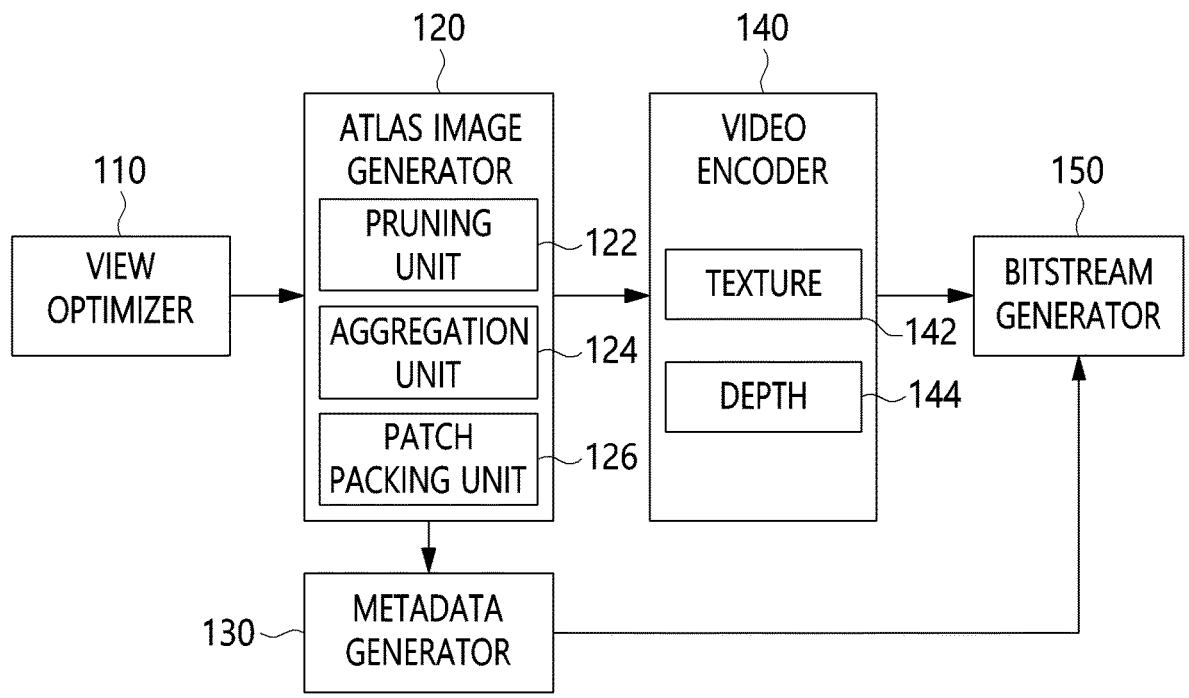
FIG. 1 is a block diagram of an immersive video processing apparatus according to an embodiment of the present disclosure.

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

Embodiments of the present invention will now be described in detail with reference to the accompanying drawings. Like numerals refer to like elements throughout, and overlapping descriptions will be omitted.

"Immersive video" denotes a video, the viewport of which can be dynamically changed when the viewing position of a user is changed. In order to implement immersive video, multiple input images are required. Respective input images may be referred to as source images or view images. Different view indices may be assigned to respective view images.

The immersive video may be classified into 3 Degrees of Freedom (DoF), 3DoF+, Windowed-6DoF, and 6DoF types. 3DoF-based immersive video may be implemented using only texture images. Meanwhile, in order to render an immersive video such as a 3DoF+ or 6DoF video, including depth information, a depth image as well as texture images may be required.

It is assumed that embodiments to be described later are implemented to process immersive videos, such as 3DoF+ and/or 6DoF videos, including depth information. Further, it is assumed that a view image is composed of a texture image and a depth image.

FIG. 1 is a block diagram illustrating an immersive video processing apparatus according to an embodiment of the present disclosure.

Referring to FIG. 1, the immersive video processing apparatus according to the present disclosure may include a view optimizer 110, an atlas generator 120, a metadata generator 130, a video encoder 140, and a bitstream generator 150.

The immersive video processing apparatus receives multiple pairs of images, intrinsic camera parameters, and extrinsic camera parameters as input values, and then encodes an immersive video. Here, the multiple pairs of images may include texture images (attribute components) and depth images (geometry components). Respective pairs may have different views. Accordingly, a pair of input images may be designated as view images. Respective view images may be identified by indices thereof. In this case, indices assigned to respective view images may be designated as "views" or "view indices".

The intrinsic camera parameters may include a focal length, a main point position, etc., and the extrinsic camera parameters may include the position, orientation, etc. of each camera. The intrinsic camera parameters and the extrinsic camera parameters may be treated as camera parameters or view parameters.

The view optimizer 110 divides the view images into multiple groups. The view images are divided into multiple groups, and thus independent encoding processing may be performed for each group. For example, view images captured by N spatially consecutive cameras may be combined into respective groups. By means thereof, view images having relatively coherent depth information may be combined into a single group, thus improving rendering quality.

Further, since information dependency between respective groups may be removed, a spatial random access service that enables only information about the area currently being viewed by a user to be selectively loaded and performs rendering on the loaded information may be performed.

Whether the view images are to be divided into multiple groups may be optionally determined.

Further, the view optimizer 110 may classify view images into a base image and additional images. The base image may be a view image that has the highest pruning priority and that is not pruned, and the additional image may be view images having a pruning priority lower than that of the base image.

The view optimizer 110 may determine at least one of view images to be a base image. The view images not selected as the base image may be classified as additional images.

The view optimizer 110 may determine the base image in consideration of the viewing positions of the view images. For example, a view image, the view position of which is the center, among the multiple view images, may be selected as the base image.

Alternatively, the view optimizer 110 may select the base image based on camera parameters. In detail, the view optimizer 110 may select the base image based on at least one of camera indices, priorities between cameras, the positions of cameras, and information about whether the corresponding camera is a camera present in a region of interest.

For example, at least one of the view image having the smallest camera index, the view image having the largest camera index, a view image having a camera index equal to a predefined value, a view image captured by the camera having the highest priority, a view image captured by the camera having the lowest priority, a view image captured by a camera at a predefined position (e.g., a central position), and a view image captured by a camera present in a region of interest may be determined to be the base image.

Alternatively, the view optimizer 110 may determine the base image based on the quality of the view images. For example, the view image having the highest quality, among the view images, may be determined to be the base image.

Alternatively, the view optimizer 110 may check the extent of data redundancy between the view images, and may thereafter determine the base image based on the data redundancy rates of other view images. In an example, the view image having the highest rate of data redundancy with other view images or the view image having the lowest rate of data redundancy with other view images may be determined to be the base image.

Multiple view images may be set as base images.

The atlas generator 120 generates a pruning mask by performing pruning. Also, the atlas generator 120 extracts patches using the pruning mask, and generates an atlas by combining the base image and/or the extracted patches. When the view images are divided into multiple groups, the above-described process may be independently performed for each group.

The generated atlas may be composed of a texture atlas and a depth atlas. The texture atlas denotes an image in which a base texture image and/or texture patches are combined with each other, and the depth atlas denotes an image in which a base depth image and/or depth patches are combined with each other.

The atlas generator 120 may include a pruning unit 122, an aggregation unit 124, and a patch packing unit 126.

The pruning unit 122 may perform pruning on the additional images based on a pruning priority. In detail, pruning of the additional images may be performed using a reference image having a pruning priority higher than that of the additional images.

The reference image includes the base image. In addition, the reference image may further include other additional images depending on the pruning priority of the additional images.

Whether an additional image is usable as the reference image may be selectively determined. For example, when the additional image is designated not to be used as a reference image, only the base image may be set as the reference image.

Meanwhile, when an additional image is designated to be usable as a reference image, another additional image having a pruning priority higher than those of the base image and the additional image may be set as the reference image.

Through a pruning procedure, redundant data between the additional image and the reference image may be removed. In detail, through a warping procedure based on a depth image, redundant data overlapping the reference image may be removed from the additional image. For example, depth values of the additional image and the reference image may be compared with each other, and the corresponding pixel may be determined to be redundant data if the difference between the depth values is less than or equal to a threshold value.

As a result of performing pruning, a pruning mask including information indicating whether each pixel in the additional image is valid or invalid may be generated. The pruning mask may be a binary image indicating whether each pixel in the additional image is valid or invalid. In an example, in the pruning mask, a pixel determined to be redundant data overlapping the reference image may have a value of 0, and a pixel determined not to be redundant data overlapping the reference image may have a value of 1.

A non-redundant area may have a non-rectangular shape, whereas each patch is limited to a rectangular shape. Accordingly, the patch may include not only a valid area but also an invalid area. Here, the term "valid area" means an area composed of non-redundant pixels between the additional image and the reference image. That is, the valid area refers to an area including data that is included in the additional image, but is not included in the reference image. The term "invalid area" means an area composed of redundant pixels between the additional image and the reference image. Pixels/data included in the valid area may be referred to as "valid pixels/valid data", and pixels/data included in the invalid area may be referred to as "invalid pixels/invalid data".

The aggregation unit 124 may combine pruning masks, generated on a frame basis, in units of intra-periods.

Also, the aggregation unit 124 may extract a patch from an image of the combined pruning masks through a clustering procedure. In detail, a rectangular area including valid data in the combined pruning mask image may be extracted as the patch. Regardless of the shape of the valid area, the patch may be extracted in a rectangular shape, and a patch extracted from a non-rectangular valid area may include not only valid data but also invalid data.

Here, the aggregation unit 124 may re-partition an L-shaped patch or a C-shaped patch which deteriorates coding efficiency. Here, the L-shaped patch means that the distribution of a valid area has an L shape, and the C-shaped patch means that the distribution of a valid area has a C shape.

When the distribution of a valid area has an L shape or a C shape, a portion occupied by an invalid area in the patch is relatively large. Accordingly, the L-shaped or C-shaped patch is partitioned into multiple patches, and thus improvement of coding efficiency may be promoted.

In the case of an unpruned view image, the entire view image may be treated as a single patch. In detail, the entire two-dimensional (2D) image, obtained by expanding an unpruned view image in a predetermined projection format, may be treated as a single patch. A projection format may include at least one of an Equirectangular Projection (ERP) format, a cube-map format, and a perspective projection format.

Here, the term "unpruned view image" refers to the base image having the highest pruning priority. Alternatively, an additional image in which redundant data overlapping the base image and the reference image is not present may also be defined as an unpruned view image. Alternatively, regardless of whether redundant data overlapping a reference image is present, an additional image arbitrarily excluded from a pruning target may be defined as an unpruned view image. That is, even an additional image in which redundant data overlapping a reference image is present may be defined as an unpruned view image.

The packing unit 126 packs patches into a rectangular image. Packing of the patches may be accompanied by modification such as size conversion, rotation, or flipping of the patches. An image packed with the patches may be defined as an atlas.

In detail, the packing unit 126 may generate a texture atlas by packing a base texture image and/or texture patches, and may generate a depth atlas by packing a base depth image and/or depth patches.

The entire base image may be treated as one patch. That is, the base image may be packed into an atlas without change. When the entire image is treated as one patch, the corresponding patch may be referred to as a complete image (complete view) or a complete patch.

The number of atlases generated by the atlas generator 120 may be determined based on at least one of the array structure of camera rigs, the accuracy of a depth map, and the number of view images.

The metadata generator 130 may generate metadata for image composition. The metadata may include at least one of camera-related data, pruning-related data, atlas-related data, and patch-related data.

The pruning-related data may include pieces of information required in order to determine pruning priorities of view images. In an example, at least one of a flag indicating whether the corresponding view image is a root node and a flag indicating whether the view image is a leaf node may be encoded. The root node indicates the view image having the highest pruning priority (i.e., a base image), and the leaf node indicates the view image having the lowest pruning priority.

When a view image is not a root node, a parent node index may be additionally encoded. The parent node index may indicate the image index of a view image that is a parent node.

Alternatively, when a view image is not a leaf node, a child node index may be additionally encoded. The child node index may indicate the image index of a view image that is a child node.

The atlas-related data may include at least one of information about the size of each atlas, information about the number of atlases, information about the priorities of atlases, and a flag indicating whether each atlas includes a complete image. The atlas size may include at least one of size information of a texture atlas and size information of a depth atlas. In this case, a flag indicating whether the size of the depth atlas is identical to that of the texture atlas may be additionally encoded. When the size of the depth atlas is different from that of the texture atlas, the reduction ratio information of the depth atlas (e.g., scaling-related information) may be additionally encoded. The atlas-related data may be included in the "view parameters list" field in a bitstream.

For example, the syntax element geometry_scale_enabled_flag indicating whether reduction (downscaling) of the depth atlas is permitted may be encoded/decoded. When the value of the syntax element geometry_scale_enabled_flag is equal to 0, this means that reduction of a depth atlas is not permitted. In this case, the depth atlas has the same size as the texture atlas.

When the value of the syntax element geometry_scale_enabled_flag is equal to 1, this means that reduction of a depth atlas is permitted. In this case, information required to determine the reduction ratio of the depth atlas may be additionally encoded/decoded. For example, the syntax element geometry_scaling_factor_x indicating the horizontal reduction ratio of the depth atlas and the syntax element geometry_scaling_factor_y indicating the vertical reduction ratio of the depth atlas may be additionally encoded/decoded.

An immersive video output (display) apparatus may decode information about the reduction ratio of the depth atlas, and may then reconstruct the reduced depth atlas at the original size.

The patch-related data includes pieces of information required in order to specify the location and/or size of patches in an atlas image, the view image to which the patches belong, and the location and/or the size of the patches in the view image. For example, at least one of location information indicating the location of patches in the atlas image and size information indicating the size of patches in the atlas image may be encoded. Further, a source index for identifying the view image from which the patches originate may be encoded. The source index indicates the index of the view image that is the origin of the patches. Further, at least one of location information indicating the location of patches in the view image and size information indicating the size of the patches in the view image may be encoded. The patch-related information may be included in the "atlas data" field in a bitstream.

The video encoder 140 encodes the atlases. When view images are divided into multiple groups, atlases may be generated for respective groups. Accordingly, video encoding may be performed independently for each group.

The video encoder 140 may include a texture image encoder unit 142 for encoding a texture atlas and a depth image encoder unit 144 for encoding a depth atlas.

The bitstream generator 150 generates a bitstream based on encoded video data and metadata. The generated bitstream may be transmitted to the immersive video output apparatus.

Figure 2:
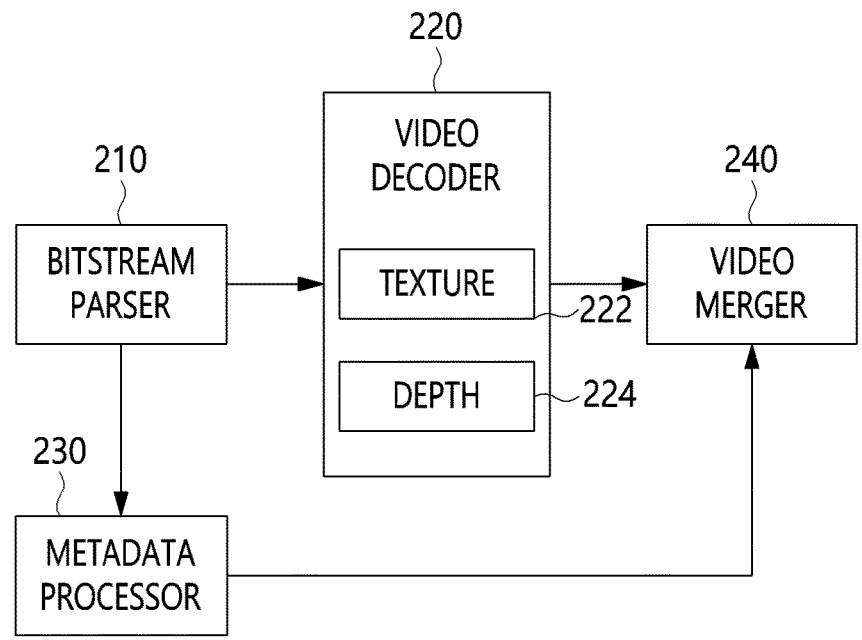
FIG. 2 is a block diagram of an immersive video output apparatus according to an embodiment of the present disclosure.

FIG. 2 is a block diagram illustrating an immersive video output apparatus according to an embodiment of the present disclosure.

Referring to FIG. 2, the immersive video output apparatus according to the present disclosure may include a bitstream parser 210, a video decoder 220, a metadata processor 230, and a video synthesizer 240.

The bitstream parser 210 may parse video data and metadata from a bitstream. The video data may include data about encoded atlases. When a spatial random access service is supported, only a partial bitstream including the viewing position of a user may also be received.

The video decoder 220 decodes parsed video data. The video decoder 220 may include a texture image decoder unit 222 for decoding a texture atlas and a depth image decoder unit 224 for decoding a depth atlas.

The metadata processor 230 unformats the parsed metadata.

The unformatted metadata may be used to synthesize images at specific views. For example, when motion information of the user is input to the immersive video output apparatus, the metadata processor 230 may determine atlases required for video synthesis, patches required for video synthesis, the location/size of patches in the atlases, etc. in order to reproduce a viewport image depending on the motion of the user.

The video synthesizer 240 may dynamically synthesize viewport images depending on the motion of the user. In detail, the video synthesizer 240 may extract patches required in order to synthesize viewport images from the atlases using information determined by the metadata processor 230 depending on the motion of the user. In detail, the atlases including the information of view images required to synthesize viewport images may be determined, patches may be extracted from the view images in the atlases, and the extracted patches may be synthesized to generate a viewport image.

Figure 3:
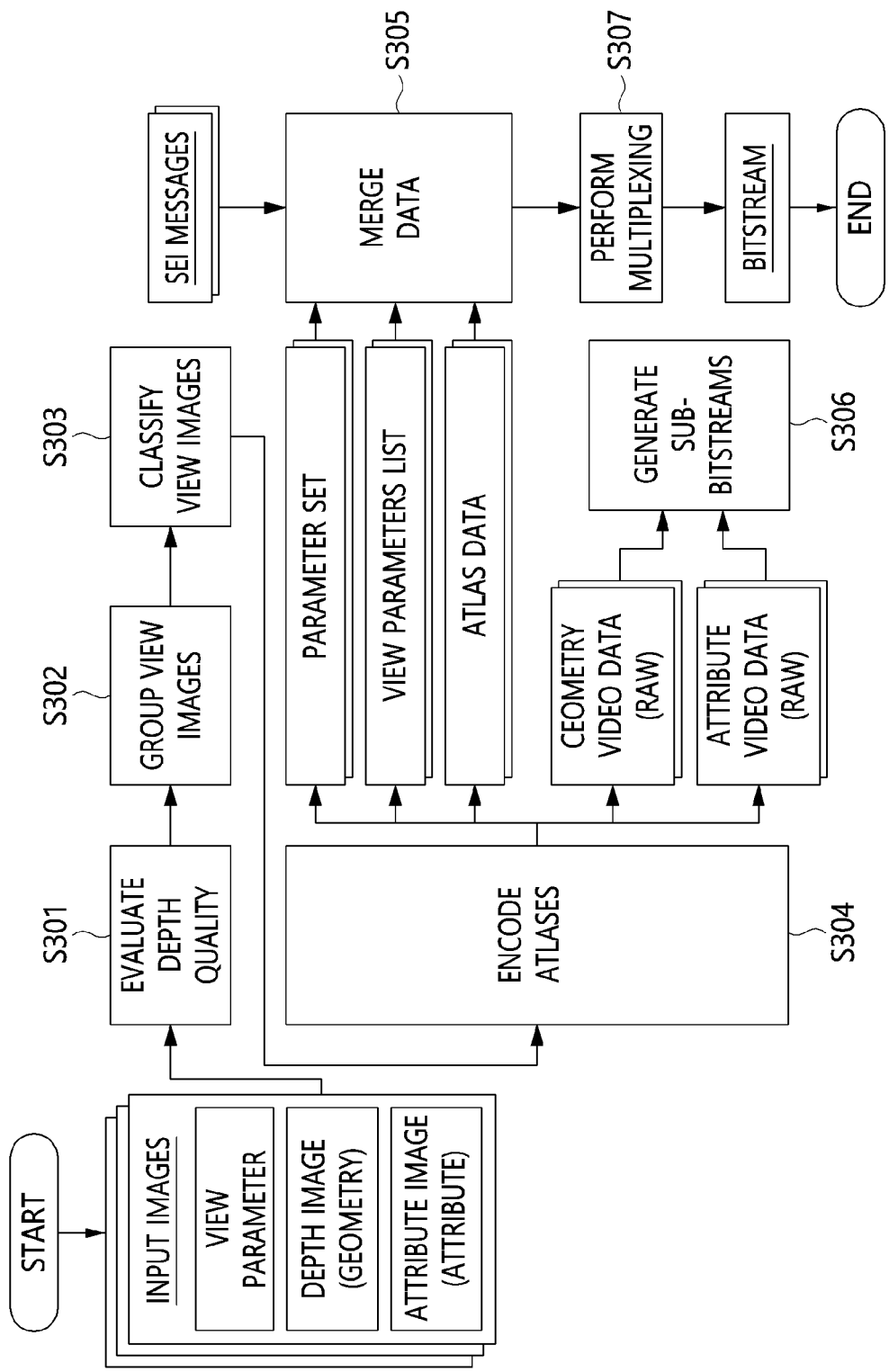
FIG. 3 is a flow diagram illustrating an immersive video processing method.
Figure 5:
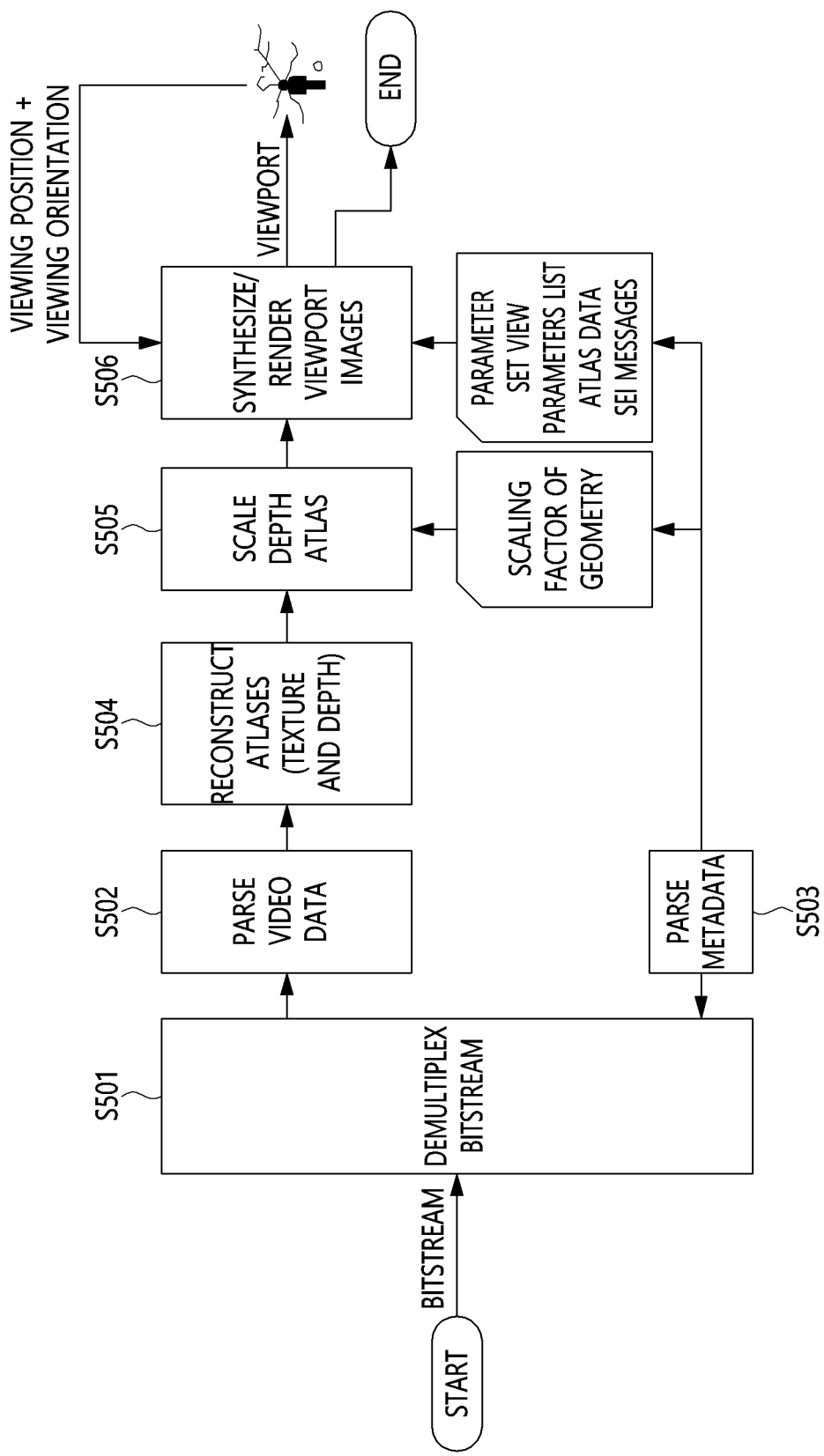
FIG. 5 is an operation flow diagram illustrating an immersive video output method.

FIGS. 3 and 5 are flow diagrams illustrating an immersive video processing method and an immersive video output method, respectively.

In the following flow diagrams, letters that are in italics or underlined denote input or output data required in order to perform each step. Further, in the following flow diagrams, arrows indicate the processing sequence of individual steps. Here, steps that are not connected by arrows may mean that the temporal sequence between the corresponding steps is not determined or that the corresponding steps may be processed in parallel. Also, it is also possible to process or output (display) immersive video in a sequence different from that illustrated in the following flow diagrams.

The immersive video processing apparatus may receive multiple input images and at least one of intrinsic camera parameters and extrinsic camera parameters, and may evaluate the quality of a depth map based on the received data at step S301. Here, the input images may be implemented as one pair including a texture image (i.e., an attribute component) and a depth image (i.e., a geometry component).

The immersive video processing apparatus may sort the input images into multiple groups based on position proximity to multiple cameras at step S302. The input images may be sorted into multiple groups, and thus pruning and encoding may be independently performed by adjacent cameras having a relatively coherent depth value. Also, through the above procedure, a spatial random access service in which rendering is performed using only information in the area currently being viewed by a user may be performed.

However, the above-described steps S301 and S302 are only selective procedures, and the present procedures are not necessarily performed.

When the input images are sorted into multiple groups, procedures to be described later may be independently performed for respective groups.

The immersive video processing apparatus may determine the pruning priorities of view images at step S303. More specifically, the view images may be classified into a base image and additional images, and the pruning priorities of the additional images may be set.

Figure 4:
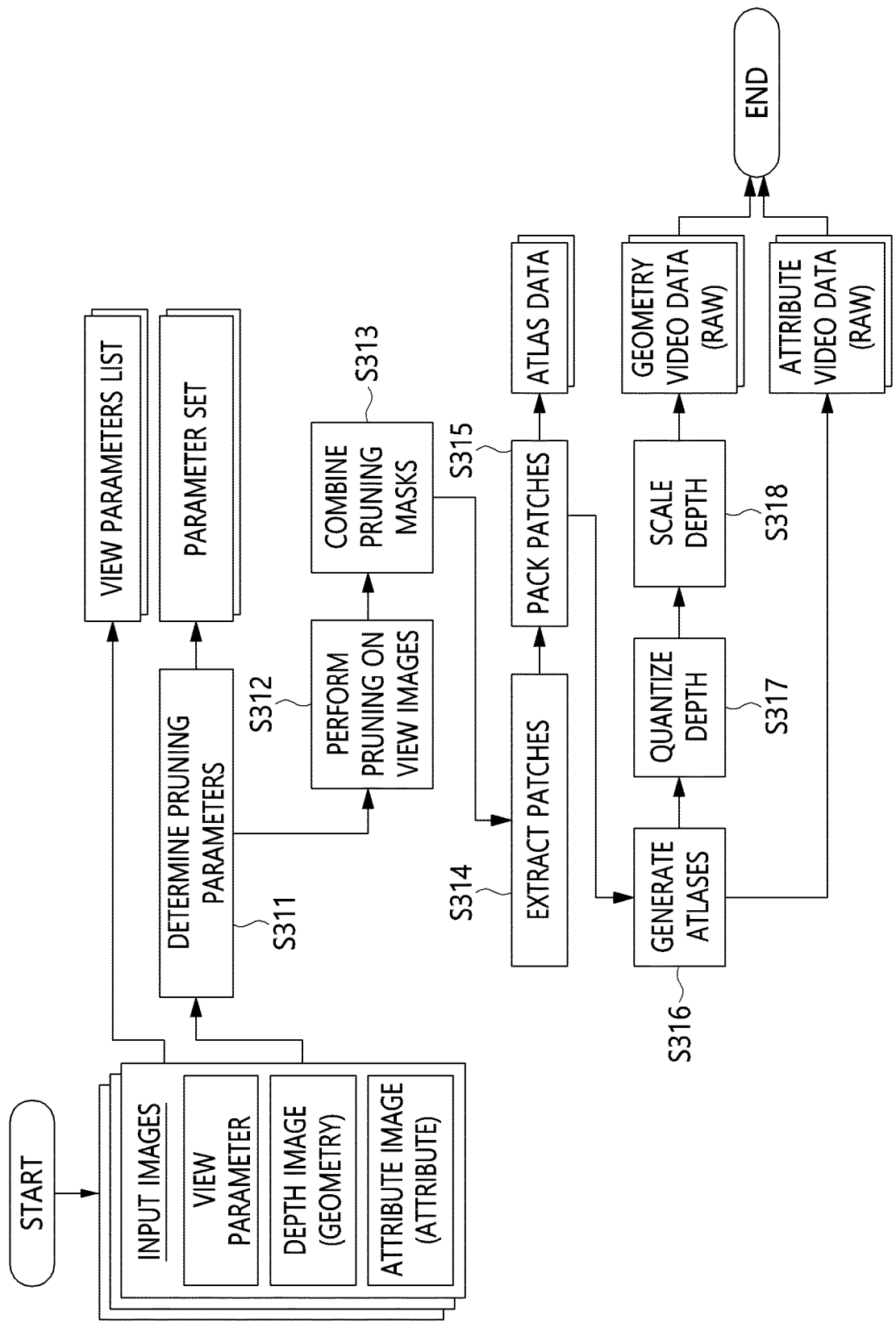
FIG. 4 is a flow diagram illustrating an atlas encoding process.

Thereafter, atlases may be generated based on the pruning priorities, and the generated atlases may be encoded at step S304. The process of encoding atlases is illustrated in detail in FIG. 4.

In detail, pruning parameters (e.g., a pruning priority or the like) may be determined at step S311, and pruning may be performed on view images based on the determined pruning parameters at step S312. As a result of performing pruning, the base image having the highest priority is maintained without change. Meanwhile, through pruning of the additional images, redundant data between the additional images and reference images is removed. The redundant data between the additional images and the reference images may be removed through a warping procedure based on the depth image.

Pruning masks may be generated as a result of performing pruning. When the pruning masks are generated, the pruning masks are combined with each other in units of intra-periods at step S313. Then, patches may be extracted from texture images and depth images using the combined pruning masks at step S314. In detail, the patches may be extracted by masking the texture images and the depth images with the combined pruning masks.

Here, for an unpruned view image (e.g., the base image), the entire view image may be treated as a single patch.

Thereafter, the extracted patches may be packed at step S315, and atlases may be generated at step S316. In detail, a texture atlas and a depth atlas may be generated.

Further, the immersive video processing apparatus may set a threshold value that is required in order to determine, based on the depth atlas, whether the corresponding pixel is valid or invalid at step S317. In an example, a pixel, the value of which in each atlas is less than a threshold value, may correspond to an invalid pixel, and a pixel, the value of which in each atlas is equal to or greater than the threshold value, may correspond to a valid pixel. The threshold value may be determined on an image basis, or on a patch basis.

In order to reduce the amount of data, the size of the depth atlas may be reduced (scaled) at a specific ratio at step S318. When the size of the depth atlas is reduced, information about the reduction ratio (e.g., a scaling factor) of the depth atlas may be encoded. The immersive video output apparatus may reconstruct the size of the texture atlas and the size of the depth atlas, reduced through the scaling factor, to the original sizes thereof.

The metadata (e.g., a parameter set, a view parameter list or atlas data) generated in the atlas-encoding process is combined with Supplemental Enhancement Information (SEI) at step S305. Also, sub-bitstreams may be generated by respectively encoding the texture atlas and the depth atlas at step S306. Further, a single bitstream may be generated by multiplexing the encoded metadata and the encoded atlases at step S307.

The immersive video output apparatus demultiplexes the bitstream received from the immersive video processing apparatus at step S501. As a result, video data, that is, atlas data and metadata, may be respectively extracted (parsed) at steps S502 and S503.

The immersive video output apparatus may reconstruct atlases based on the parsed video data at step S504. Here, when the depth atlas is reduced at a specific ratio, related information may be acquired from the metadata, and the depth atlas may be scaled to the original size at step S505.

When motion of the user occurs, an atlas required for viewport image synthesis depending on the motion of the user may be determined based on the metadata, and patches included in the atlas may be extracted. A viewport image may be generated and rendered at step S506. Here, in order to synthesize the generated patches, size/location information of each patch, camera parameters, etc. may be used.

FIG. 6 is a flowchart illustrating an immersive video encoding method according to an embodiment of the present invention.

The immersive video encoding method according to the embodiment of the present invention may be performed by an immersive video encoding apparatus such as a computing device.

Referring to FIG. 6, the immersive video encoding method according to the embodiment of the present invention may include step S110 of setting basic view images among input images corresponding to multiple views, step S120 of generating atlas images using the basic view images, step S130 of performing encoding on the atlas images, and step S140 of generating metadata about the encoded atlas images, wherein the atlas images include a texture atlas or a depth atlas.

Here, the depth atlas may be generated using basic view images satisfying a preset condition.

Here, at step S110 of setting the basic view images, the order of the set basic view images may be reshuffled.

Here, the basic view images satisfying the preset condition may include images for the most distant view, among the basic view images.

Here, the metadata may include data indicating whether each encoded atlas image has depth information.

Here, the depth atlas may be split into multiple main blocks, each of which may be split into one or more sub-blocks based on whether the corresponding main block is to be split.

Each of the main blocks may be split into four sub-blocks equal to each other in a height and a width, two sub-blocks equal to each other in a height and a width, or two sub-blocks different from each other in any one of a height and a width depending on the split type.

Here, the metadata may include information indicating whether each main block is to be split, and indicating the split type.

Here, each sub-block may be recursively split into one or more sub-blocks based on whether the corresponding block is to be split.

Here, the metadata may include information about the split type of the depth atlas, and the split type may include a block-based split type.

FIG. 7 is a flowchart illustrating an immersive video decoding method according to an embodiment of the present invention.

The immersive video decoding method according to the embodiment of the present invention may be performed by an immersive video decoding apparatus such as a computing device.

Referring to FIG. 7, the immersive video decoding method according to the embodiment of the present invention may include step S210 of decoding an input bitstream and step S220 of rendering an immersive video based on a decoded image and decoded metadata, wherein the decoded image includes a texture atlas or a depth atlas.

Here, the depth atlas may correspond to basic view images satisfying a preset condition.

Here, the basic view images satisfying the preset condition may include the images for the most distant view, among multiple basic view images.

Here, the metadata may include data indicating whether the decoded image has depth information.

Here, the depth atlas may be split into multiple main blocks, each of which may be split into one or more sub-blocks based on whether the corresponding main block is to be split.

Each of the main blocks may be split into four sub-blocks equal to each other in a height and a width, two sub-blocks equal to each other in a height and a width, or two sub-blocks different from each other in any one of a height and a width depending on the split type.

Here, the metadata may include information indicating whether each main block is to be split, and indicating the split type.

Here, each sub-block may be recursively split into one or more sub-blocks based on whether the corresponding block is to be split.

Here, the metadata may include information about the split type of the depth atlas, and the split type may include a block-based split type.

Hereinafter, with reference to FIGS. 8 to 12, an immersive video encoding method and an immersive video decoding method according to embodiments of the present invention will be described in detail.

Figure 8:
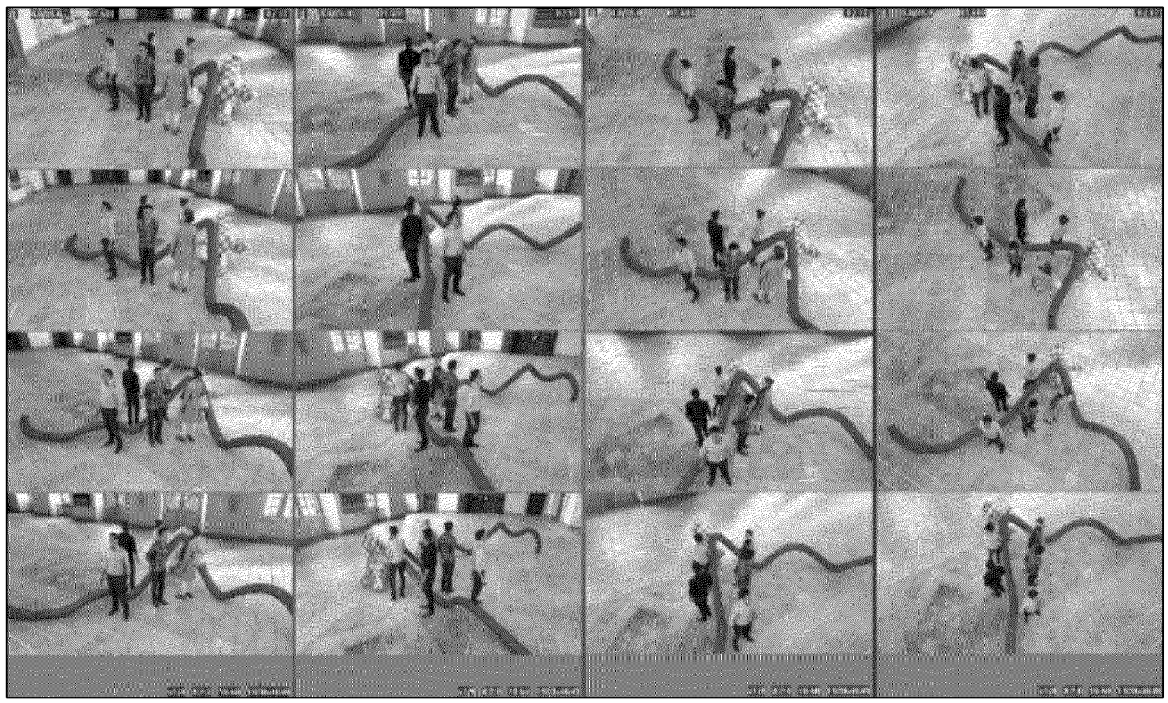
FIG. 8 illustrates an example of an atlas generation method supported in an MPEG Immersive Video (MIV) standard.

FIG. 8 is a diagram illustrating an example of an atlas generation method supported in a MPEG Immersive Video (MIV) standard.

A current MIV standard supports a geometry absent profile of packing texture images for respective views corresponding to some of various input views into an atlas at the preprocessing step, compressing the atlas, and sending the compressed atlas to a post-processing/reproduction step, wherein, at the post-processing/reproduction step, the texture images for respective views are unpacked from the atlas, and thereafter a depth map extraction task is performed based on the unpacked texture images for respective views.

The geometry absent profile may improve reproduction quality by additionally allocating texture information into space into which depth map information is to be inserted, but is disadvantageous in that depth map estimation is performed by a terminal, thus increasing complexity of the terminal.

Therefore, the encoding and decoding methods according to embodiments of the present invention are intended to increase the accuracy of a depth map while reducing the complexity of depth map estimation by the terminal.

Figure 9:
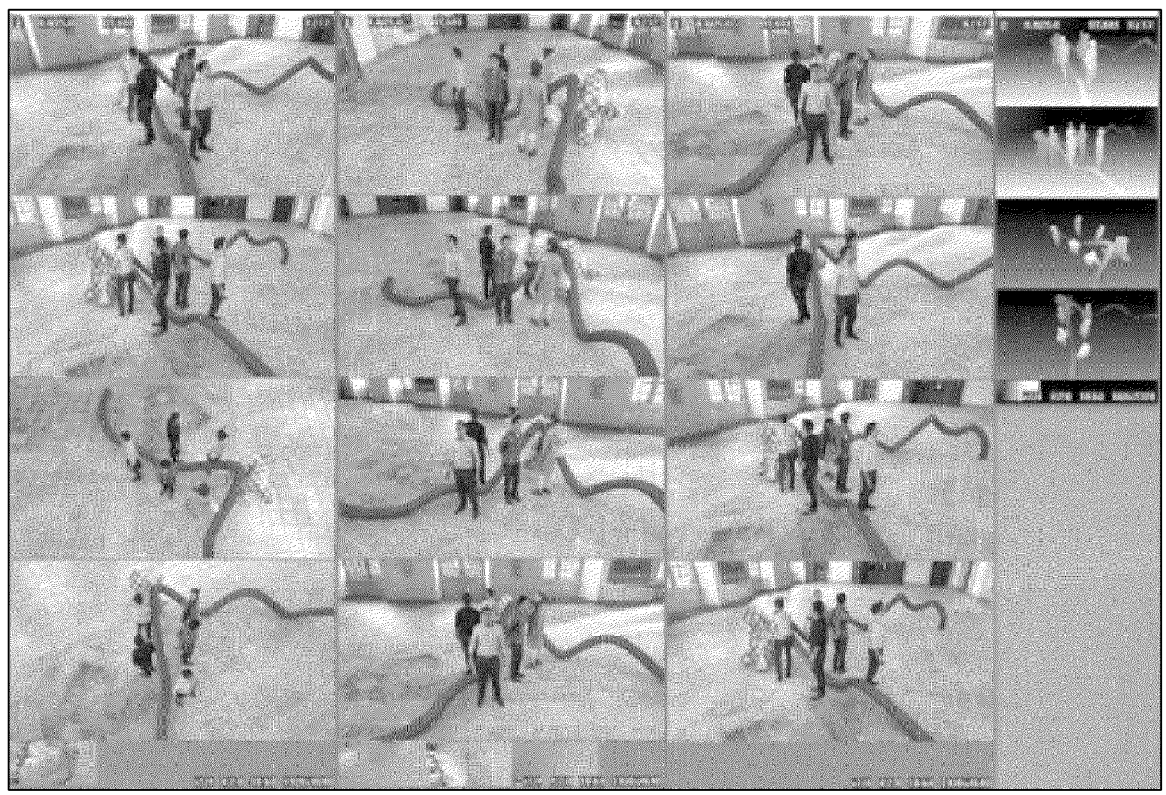
FIG. 9 illustrates an example of an atlas generation method according to an embodiment of the present invention.

FIG. 9 illustrates an example of an atlas generation method according to an embodiment of the present invention.

Referring to FIG. 9, an atlas generated by the method according to the embodiment of the present invention may provide information that can be referenced when a depth map at another view is estimated at the reproduction step by sending a depth map instead of texture information for some views.

Figure 10:
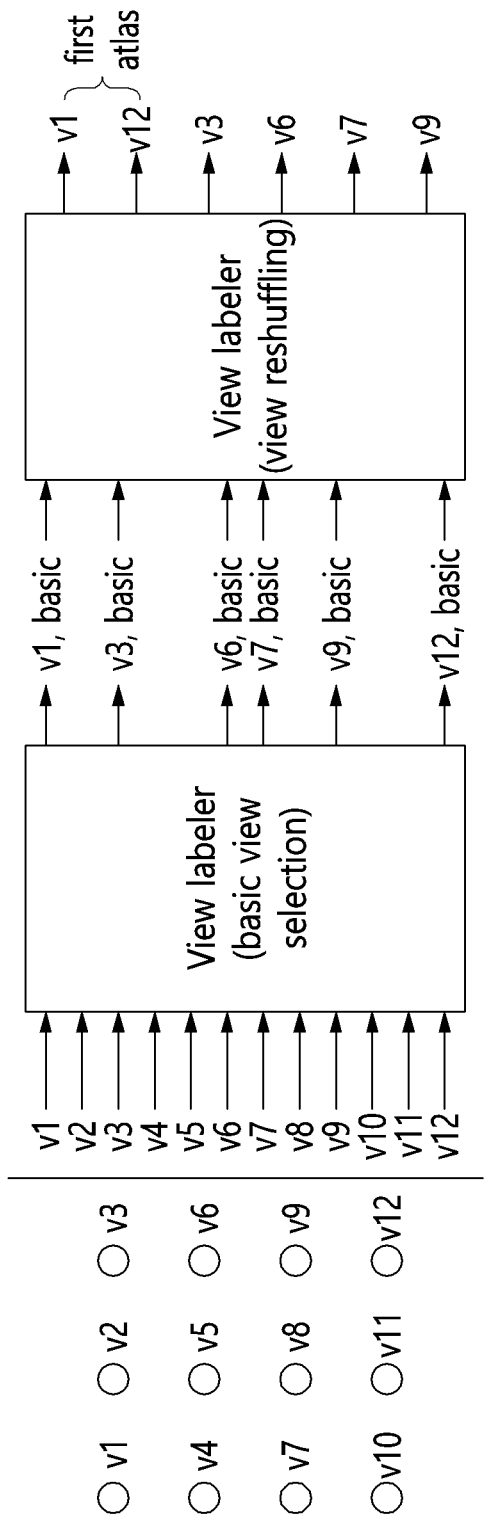
FIG. 10 is a diagram conceptually illustrating selection and reshuffling of basic view images in a method according to an embodiment of the present invention.

FIG. 10 is a diagram conceptually illustrating selection and reshuffling of basic view images according to an embodiment of the present invention.

Referring to FIG. 10, it can be seen that 12 view images ranging from v1 to v12 are used as input, and v1, v3, v6, v7, v9, and v12 are selected as basic view images. Next, by utilizing the images selected as the basic view images as input, the order of basic view images may be reshuffled such that view images for views v1 and v12 correspond to a first atlas.

Here, the views v1 and v12 set to correspond to the first atlas may correspond to the most distant views.

That is, referring to FIG. 9, it can be seen that only depth information for some views is transmitted, with the depth information being included in the atlas, and depth information for views at which depth information is not included may be calculated in a decoding stage through depth value estimation.

Figure 11:
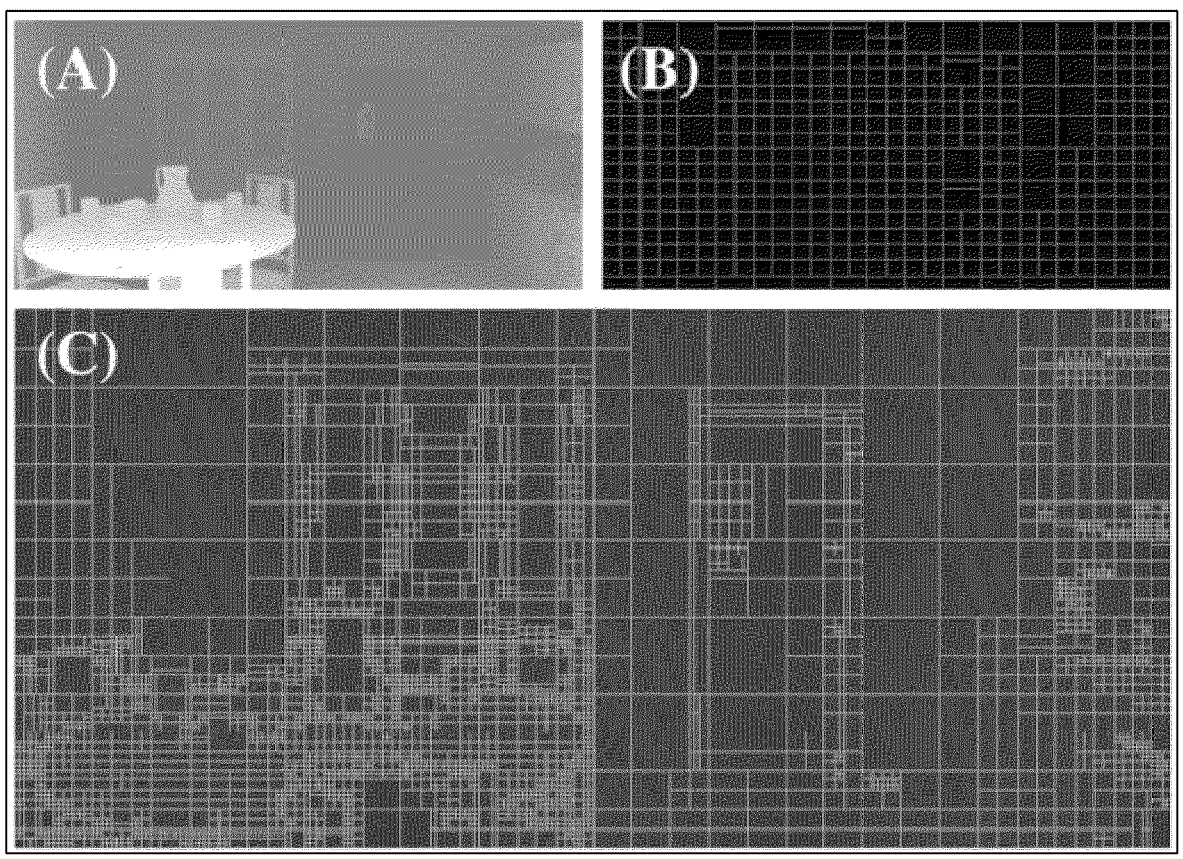
FIG. 11 is a diagram conceptually illustrating a recursive block split method according to an embodiment of the present invention.

FIG. 11 is a diagram conceptually illustrating a recursive block split method according to an embodiment of the present invention.

Here, a depth map may denote a picture (frame) composed of pieces of depth information, and may indicate, for example, a depth atlas.

The geometry absent profile supported in an MIV standard supports technology for transferring various types of information about a depth map, contained at a preprocessing step on a square block basis to a terminal, and a metadata structure.

Referring to FIG. 11, an existing method is disadvantageous in that it supports split into a block having up to a minimum size of 64, as in the case of (B), thus making it impossible to transmit detailed depth information.

Therefore, the block split method according to the embodiment of the present invention supports generation of sub-blocks having a smaller size by applying the concept of recursive block split, as in the case of (C), thus transmitting precise and fine depth value information.

The following Table 1 shows a syntax table including syntax elements according to an embodiment of the present invention.

TABLE 1

| | Descriptor |
|---|---|
| geometry_assistance( payloadSize ) { | |
|     gas_qs | ue(v) |
|     gas_num_views_minus1 | ue(v) |
|     gas_log2_bw_minus2 | ue(v) |
|     gas_max_number_of_splits | ue(v) |
|     gasBw = 1 << ( gas_log2_bw_minus2 + 2 ) | |
|     for( v = 0; v <= gas_num_views_minus1; v++ ) { | |
|         gas_is_assistance_available[ v ] | u(1) |
|         gas_projection_plane_height_minus1[ v ] | ue(v) |
|         gas_projection_plane_width_minus1[ v ] | ue(v) |
|         for( l = 0; l < ( gas_projection_plane_height_minus1[ v ] + gasBW ) /gasBW; l++ ) { | |
|             for( c = 0; c < ( gas_projection_plane_width_minus1[ v ] + gasBW ) / gasBW; c++ ) { | |
|                 recursiveSplitFunction( 1, c, 0 ) | |
|             } | |
|         } | |
|     } | |
| } | |
| recursiveSplitFunction( sbl, sbc, lvl ) { | |
|     if ( lvl < gas_max_number_of_splits ) { | |
|         gas_split_flag | u(1) |
|     } | |
|     if( lvl < gas_max_number_of_splits && gas_split_flag ) { | |
|         gas_quad_split_flag | u(1) |
|         if( gas_quad_split_flag ) { | |
|             recursiveSplitFunction( sbl, sbc, lvl + 1) | |
|             recursiveSplitFunction( sbl, sbc + 1, lvl + 1) | |
|             recursiveSplitFunction( sbl + 1, sbc, lvl + 1) | |
|             recursiveSplitFunction( sbl + 1, sbc + 1, lvl + 1) | |
|         } else { | |
|             gas_split_orientation_flag | u(1) |
|             gas_split_symmetry_flag | u(1) |
|             if( !gas_split_symmetry_flag ) { | |
|                 gas_split_first_block_bigger | u(1) |
|             } | |
|             if( gas_split_orientation_flag ) { | |
|                 recursiveSplitFunction( sbl, sbc, lvl + 1) | |
|                 recursiveSplitFunction( sbl, sbc + 1, lvl + 1) | |
|             } else { | |
|                 recursiveSplitFunction( sbl, sbc, lvl + 1) | |
|                 recursiveSplitFunction( sbl + 1, sbc, lvl + 1) | |
|             } | |
|         } | |
|     } else { | |
|         gas_skip_flag | u(1) |
|         if( !gas_skip_flag ) { | |
|             if ( sbl == 0 && sbc == 0 ) { /*None*/ | |
|                 LTMinFlag = 2 | |
|                 LTMaxFlag = 2 | |
|             } else if( sbl == 0 ) { /*Left*/ | |
|                 LTMinFlag = 0 | |
|                 LTMaxFlag = 0 | |
|             } else if( sbc == 0 ) { /*Top*/ | |
|                 LTMinFlag = 1 | |
|                 LTMaxFlag = 1 | |
|             } else { | |
|                 gas_ltmin_flag | u(1) |
|                 gas_ltmax_flag | u(1) |
|                 LTMinFlag = gas_ltmin_flag | |
|                 LTMaxFlag = gas_ltmax_flag | |

TABLE 1-continued

| | Descriptor |
|---|---|
|        } | |
|        gas_zmin_delta | se(v) |
|        gas_zmax_delta | se(v) |
|       } | |
|     } | |
|   } | |
| } | |

Referring to Table 1, the encoding method according to the embodiment of the present invention may split a depth map into squares (main blocks) having a uniform size, and each of the squares (main blocks) having a uniform size may be recursively split into sub-blocks having a smaller size.

The syntax element gas_qs indicates the value of a quantization step used to define limits of a depth range. The variable Qstep indicating the quantization step may be set to a value indicated by the syntax element gas_qs.

The syntax element gas_log 2_bw_minus2 may be set to a value indicating the width and/or the height of each main block in the picture. A relationship between the variable gasBW corresponding to the width and/or height of the main block and the syntax element gas_log 2_bw_minus2 may be represented by the following Equation (1):

$$gasBw = 1 << (gas\_log\,2\_bw\_minus2[v]+2) \quad (1)$$

Here, gasBw may be an integer corresponding to powers of 2, and may have a value greater than 4.

The syntax element gas_max_number_of_splits denotes the maximum number of splits of the corresponding block in the recursive block split method.

The syntax element gas_projection_plane_height_minus1 and the syntax element gas_projection_plane_width minus1 denote values obtained by subtracting 1 from a vertical resolution and a horizontal resolution, respectively.

FIG. 12 is a table illustrating syntax values depending on split types.

Referring to FIG. 12 and Table 1, the syntax element gas_split_flag indicates whether a current block is to be split into smaller sub-blocks. For example, a value of the syntax element gas_split_flag equal to 0 may indicate that the current block is not to be split into sub-blocks.

The syntax element gas_quad_split_flag indicates whether square-type split is applied to the current block. A value of the syntax element gas_quad_split_flag equal to 0 indicates that the current block is split (partitioned) into two rectangular sub-blocks, and a value of the syntax element gas_quad_split_flag equal to 1 indicates that the current block is split into four square sub-blocks.

The syntax element gas_split_orientation_flag indicates whether the current block is split in a horizontal direction or a vertical direction. A value of the syntax element gas_split_orientation_flag equal to 0 indicates that the current block is split in a horizontal direction. A value of the syntax element gas_split_orientation_flag equal to 1 indicates that the current block is split in a vertical direction.

The syntax element gas_split_symmetry_flag indicates whether two sub-blocks generated by splitting the current block have different sizes. A value of the syntax element gas_split_symmetry_flag equal to 0 indicates that the sizes of the two sub-blocks are different from each other. A value of the syntax element gas_split_symmetry_flag equal to 1 indicates that the sizes of the two sub-blocks are identical to each other.

The syntax element gas_split_first_block_bigger indicates whether the size of the first sub-block is greater than that of the second sub-block. A value of the syntax element gas_split_orientation_flag equal to 0 indicates that the first sub-block is a sub-block located in the left portion of the current block, and a value of the syntax element gas_split_orientation_flag equal to 1 indicates that the first sub-block is a sub-block located in the upper portion of the current block. A value of the syntax element gas_split_first_block_bigger equal to 0 indicates that the first sub-block has a size larger than that of the second sub-block. A value of the syntax element gas_split_first_block_bigger equal to 1 indicates that the first sub-block has a size less than that of the second sub-block.

The syntax element gas_skip_flag indicates whether depth estimation information of the current block is explicitly encoded/decoded. When the value of the syntax element gas_skip_flag is 0, the bitstream may include the syntax elements zmin_delta and gas_ltmin_flag, related to the minimum value of the depth range of the current block, and the syntax elements gas_zmax_delta and gas_ltmax_flag, related to the maximum value of the depth range.

When the value of the syntax element gas_skip_flag is 1, a bitstream does not include the depth estimation information of the current block. In this case, the depth information of the current block may be set to be identical to the depth information of a previous block in a previous frame.

That is, by means of the syntax element gas_skip_flag, whether the depth estimation information of the current block is to be updated may be determined. When it is determined that update of the depth estimation information of the current block is to be skipped based on the syntax element gas_skip_flag, the depth information of the previous frame may be reused. In contrast, when it is determined that the update of the depth estimation information of the current block is not to be skipped based on the syntax element gas_skip_flag, the depth information of the current block may be estimated based on the depth estimation information (the minimum value of the depth range and the maximum value of the depth range) of the current block.

The syntax element gas_ltmin_flag specifies the block to be used to derive a prediction value for the minimum value of the depth range of the current block. For example, a value of the syntax element gas_ltmin_flag equal to 0 means that the minimum value of the depth range of the left neighboring block of the current block is set to a prediction value for the minimum value of the depth range of the current block. A value of the syntax element gas_ltmin_flag equal to 1 means that the minimum value of the depth range of the top neighboring block of the current block is set to a prediction value for the minimum value of the depth range of the current block.

The syntax element gas_ltmax_flag specifies the block to be used to derive a prediction value for the maximum value of the depth range of the current block. For example, a value of the syntax element gas_ltmax_flag equal to 0 means that the maximum value of the depth range of the left neighboring block of the current block is set to a prediction value for the maximum value of the depth range of the current block. A value of the syntax element gas_ltmax_flag equal to 1 means that the maximum value of the depth range of the top neighboring block of the current block is set to a prediction value for the maximum value of the depth range of the current block.

The syntax element gas_zmin_delta indicates the difference between the minimum value of the depth range and the prediction value for the minimum value of the depth range. The decoder may derive the minimum value of the depth range by adding the prediction value for the minimum value of the depth range to the difference. Here, the difference value may be derived by obtaining a value, indicated by the quantization step, with respect to the value of the syntax element gas_zmin_delta.

The syntax element gas_zmax_delta indicates the difference between the maximum value of the depth range and the prediction value for the maximum value of the depth range. The decoder may derive the maximum value of the depth range by adding the prediction value for the maximum value of the depth range to the difference. Here, the difference value may be derived by obtaining a value, indicated by the quantization step, with respect to the value of the syntax element gas_zmax_delta.

The following Equations (2) and (3) show examples in which the minimum value and the maximum value of the depth range of the current block are derived.

$$Z\,Min = (LTMinFlag == 2\,?\,0 : LTMinFlag == 1\,?\,ZMinTop : ZMinLeft) + QStep * zmindelta \quad (2)$$

$$Z\,Max = (LTMaxFlag == 2\,?\,0 : LTMaxFlag == 1\,?\,Z\,MinTop : Z\,MinLeft) + QStep * z\,maxdelta \quad (3)$$

The variable ZMinLeft denotes the minimum value of the depth range of a left neighboring block, and the variable ZMaxLeft denotes the maximum value of the depth range of the left neighboring block. The variable ZMinTop denotes the minimum value of the depth range of a top neighboring block, and the variable ZMaxTop denotes the maximum value of the depth range of the top neighboring block.

QStep indicates the value of the quantization step. zmindelta indicates the value indicated by the syntax element gas_zmin_delta, and zmaxdelta indicates the value indicated by the syntax element gas_zmax_delta.

The variables LTMinFlag and LTMaxFlag specify the neighboring block to be used to derive a prediction value for the minimum value of the depth range and a prediction value for the maximum value of the depth range, respectively. For each of the two variables, a value equal to 1 indicates that a top neighboring block is used to derive the prediction value, and a value equal to 0 indicates that a left neighboring block is used to derive the prediction value. A value equal to 2 indicates that neither a top neighboring block nor a left neighboring block is used to derive the prediction value. In this case, the prediction value may be set to a default value (e.g., 0).

The following Table 2 shows an example of a syntax table including syntax elements according to an embodiment of the present invention.

TABLE 2

| | Descriptor |
|---|---|
| extended_geometry_assistance( payloadSize ) { | |
|   ega_num_views_minus1 | ue(v) |
|   ega_num_available_assistance_types_minus1 | u(4) |
|   for( v = 0; v <= num_views_minus1; v++ ) { | |
|     ega_assistance_present_flag[ v ] | u(1) |
|     if( ega_assistance_present_flag[ v ] == 1 ) { | |
|       for( t = 0; t <= ega_num_asssistance_types_minus1; t++ ) { | |
|         ega_assistance_type_present_flag[ v ][ t ] | u(1) |
|       } | |
|       if( ega_assistance_type_present_flag[ v ][ 0 ] == 1) { | |
|         block_based_geometry_features( v ) | |
|       } | |
|       if(ega_assistance_type_present_flag[ v ][ 1 ] == 1) { | |
|         //something else, up to 16 types | |
|       } | |
|     } | |
|   } | |
| } | |

Referring to Table 2, the encoding method according to an embodiment of the present invention may provide an extended depth assistance message.

In Table 2, the syntax element ega_num_available_asssistance_types_minus1 indicates the number of depth assistance types that are supported. For example, the value of ega_num_available_asssistance_types_minus1 may be a value obtained by subtracting 1 from an integer corresponding to powers of 2 (e.g., 15=24-1), but the scope of the present invention is not limited thereto.

The syntax element ega_assistance_present_flag indicates whether depth assistance information is present in a syntax structure. For example, a value of the syntax element ega_assistance_present_flag equal to 1 indicates that depth assistance information is present in the syntax structure. A value of the syntax element ega_assistance_present_flag equal to 0 indicates that depth assistance information for each view is not present in the syntax structure.

The syntax element ega_assistance_type_present_flag indicates whether a depth assistance type is present in the syntax structure. A value of the syntax element ega_assistance_type_present_flag equal to 0 indicates that the corresponding depth assistance type is not present in the syntax structure. A value of the syntax element ega_assistance_type_present_flag equal to 1 indicates that the corresponding depth assistance type is present in the syntax structure.

Referring to Table 2, it can be seen that the syntax element ega_assistance_type_present_flag[v][t] at t=0 indicates a block-based depth assistance type. Further, various depth assistance types may be defined depending on the value of t. As shown in Table 2, not only the block-based depth assistance type but also various depth assistance types may be supported by utilizing an extended depth assistance Supplementary Enhancement Information (SEI) message. The syntax tables shown in Tables 1 and 2 may be encoded/decoded in the form of a Supplementary Enhancement Information (SEI) message. In detail, the SEI message including information about the depth range and the block split structure shown in Table 1 and Table 2 may be designated as a depth assistance (Geometry Assistance) SEI message or an extended depth assistance (Extended Geometry Assistance) SEI message.

The particular implementations shown and described herein are illustrative examples of the present invention and are not intended to limit the scope of the present invention in any way. For the sake of brevity, conventional electronics, control systems, software development, and other functional aspects of the systems may not be described in detail. Furthermore, the connecting lines or connectors shown in the various presented figures are intended to represent exemplary functional relationships and/or physical or logical couplings between the various elements. It should be noted that many alternative or additional functional relationships, physical connections, or logical connections may be present in an actual device. Moreover, no item or component may be essential to the practice of the present invention unless the element is specifically described as "essential" or "critical".

According to the present invention, the speed of a depth map estimation procedure occurring in an immersive video rendering process may be improved.

Further, the accuracy of depth map estimation may be improved by utilizing high-quality depth map information contained in an image preprocessing step.

Furthermore, accurate depth information may be transmitted using a recursive block split method.

Therefore, the spirit of the present invention should not be limitedly defined by the above-described embodiments, and it is appreciated that all ranges of the accompanying claims and equivalents thereof belong to the scope of the spirit of the present invention.

What is claimed is:

1. An immersive video encoding method, comprising:
   setting basic view images among input images corresponding to multiple views;
   generating an atlas image using the basic view images;
   performing encoding on the atlas image; and
   generating metadata about an encoded atlas image,
   wherein the atlas image includes a texture atlas and a depth atlas,
   the depth atlas is split into multiple main blocks,
   the metadata includes information indicating whether the corresponding main block is to be split,
   when the information indicates that the corresponding main block is to be split, the corresponding main block is split into two or more sub-blocks.

2. The immersive video encoding method of claim 1, wherein the depth atlas is generated using basic view images corresponding to a preset condition.

3. The immersive video encoding method of claim 2, wherein setting the basic view images comprises:
   reshuffling an order of the set basic view images.

4. The immersive video encoding method of claim 3, wherein the basic view images corresponding to the preset condition include an image for a most distant view among the basic view images.

5. The immersive video encoding method of claim 4, wherein the metadata includes data indicating whether the encoded atlas image has depth information.

6. The immersive video encoding method of claim 1, wherein each of the main blocks is split into four sub-blocks equal to each other in a height and a width, two sub-blocks equal to each other in a height and a width, or two sub-blocks different from each other in any one of a height and a width, depending on a split type.

7. The immersive video encoding method of claim 6, wherein the metadata includes second information indicating a split type.

8. The immersive video encoding method of claim 6, wherein each sub-block is recursively split into one or more sub-blocks based on whether the corresponding block is to be split.

9. The immersive video encoding method of claim 1, wherein:
   the metadata includes information about a split type of the depth atlas, and
   the split type includes a block-based split type.

10. An immersive video decoding method, comprising:
    decoding an input bitstream; and
    rendering an immersive video based on a decoded image and decoded metadata,
    wherein the decoded image includes a texture atlas and a depth atlas,
    the depth atlas is split into multiple main blocks,
    the metadata includes information indicating whether the corresponding main block is to be split,
    when the information indicates that the corresponding main block is to be split the corresponding main block is split into two or more sub-blocks.

11. The immersive video decoding method of claim 10, wherein the depth atlas corresponds to basic view images corresponding to a preset condition.

12. The immersive video decoding method of claim 11, wherein the basic view images corresponding to the preset condition include an image for a most distant view among multiple basic view images.

13. The immersive video decoding method of claim 12, wherein the metadata includes data indicating whether the decoded image has depth information.

14. The immersive video decoding method of claim 10, wherein each of the main blocks is split into four sub-blocks equal to each other in a height and a width, two sub-blocks equal to each other in a height and a width, or two sub-blocks different from each other in any one of a height and a width, depending on a split type.

15. The immersive video decoding method of claim 14, wherein the metadata includes second information indicating a split type.

16. The immersive video decoding method of claim 14, wherein each sub-block is recursively split into one or more sub-blocks based on whether the corresponding block is to be split.

17. The immersive video decoding method of claim 10, wherein:
    the metadata includes information about a split type of the depth atlas, and the split type includes a block-based split type.

* * * * *